(12) United States Patent
Mlinarsky et al.

(10) Patent No.: US 12,193,107 B2
(45) Date of Patent: Jan. 7, 2025

(54) MULTI-FUNCTIONAL WIRELESS LINK MONITOR

(71) Applicant: SPIRENT COMMUNICATIONS, INC., San Jose, CA (US)

(72) Inventors: Fanny Mlinarsky, Bolton, MA (US); Ron Cook, Groton, MA (US)

(73) Assignee: Spirent Communications, Inc., Santa Clara, CA (US)

( * ) Notice: Subject to any disclaimer, the term of this patent is extended or adjusted under 35 U.S.C. 154(b) by 46 days.

(21) Appl. No.: 17/025,466

(22) Filed: Sep. 18, 2020

(65) Prior Publication Data

US 2021/0092582 A1    Mar. 25, 2021

Related U.S. Application Data

(60) Provisional application No. 62/902,470, filed on Sep. 19, 2019.

(51) Int. Cl.
*H04W 8/00*      (2009.01)
*H04W 24/08*    (2009.01)

(52) U.S. Cl.
CPC .......... *H04W 8/005* (2013.01); *H04W 24/08* (2013.01)

(58) Field of Classification Search
CPC ..... H04W 8/005; H04W 24/08; H04B 17/318
See application file for complete search history.

(56) References Cited

U.S. PATENT DOCUMENTS

| | | | |
|---|---|---|---|
| 6,724,730 B1 | 4/2004 | Mlinarsky et al. | |
| 7,075,893 B1 | 7/2006 | Mlinarsky et al. | |
| 8,793,541 B2 | 7/2014 | Hsu et al. | |
| 10,520,534 B1 | 12/2019 | Rowell et al. | |
| 10,893,494 B2 | 1/2021 | Chinitz et al. | |
| 2004/0236866 A1 | 11/2004 | Dugatkin et al. | |
| 2005/0053008 A1 | 3/2005 | Griesing et al. | |
| 2005/0226195 A1 | 10/2005 | Paris et al. | |
| 2006/0229020 A1 | 10/2006 | Mlinarsky et al. | |
| 2006/0233111 A1 | 10/2006 | Wright | |
| 2006/0239198 A1 | 10/2006 | Mlinarsky et al. | |
| 2007/0121712 A1* | 5/2007 | Okamoto .......... H04L 25/03343 375/222 |
| 2007/0159199 A1 | 7/2007 | Talwar et al. | |

(Continued)

OTHER PUBLICATIONS

OCTOBOX Pal-6E, and STApal-6E Product datasheet, Spirent Communications, Inc., Mar. 21, 2022, 25 pages (downloaded Jan. 24, 2023 from https://www.spirent.com/assets/u/datasheet-octobox-pal-6e-and-stapal-6e).

(Continued)

*Primary Examiner* — Harry H Kim
*Assistant Examiner* — Mohammed M Murshid
(74) *Attorney, Agent, or Firm* — Haynes Beffel & Wolfeld LLP; Ernest J. Beffel, Jr.

(57) ABSTRACT

A wireless link monitor is configured to operate as an active client that can send and/or receive wireless traffic to and/or from wireless devices-under-test (DUTs) in the network. When the wireless link monitor operates as an active client, the DUTs can send respective wireless traffic to the wireless link monitor. This ensures that the wireless link monitor receives the wireless traffic even when the DUTs transmit their wireless signals narrowly (e.g., in adaptive beamforming technologies).

24 Claims, 19 Drawing Sheets

(56) References Cited

U.S. PATENT DOCUMENTS

| | | | |
|---|---|---|---|
| 2008/0129615 A1* | 6/2008 | Breit | H04W 56/00 |
| | | | 343/703 |
| 2008/0151762 A1 | 6/2008 | Armstrong et al. | |
| 2008/0221988 A1* | 9/2008 | Bappu | H04W 40/22 |
| | | | 455/445 |
| 2009/0072838 A1 | 3/2009 | Shepherd et al. | |
| 2009/0072843 A1 | 3/2009 | Slupsky et al. | |
| 2012/0039178 A1 | 2/2012 | Holman et al. | |
| 2012/0101985 A1 | 4/2012 | Kemp et al. | |
| 2012/0269081 A1* | 10/2012 | Ho | H04B 17/27 |
| | | | 370/252 |
| 2012/0296996 A1 | 11/2012 | Lehavi et al. | |
| 2012/0317224 A1 | 12/2012 | Caldwell et al. | |
| 2013/0016739 A1 | 1/2013 | Penisoara et al. | |
| 2013/0033279 A1 | 2/2013 | Sozanski et al. | |
| 2013/0054170 A1 | 2/2013 | Sobajic et al. | |
| 2013/0145212 A1 | 6/2013 | Hsu et al. | |
| 2013/0347103 A1 | 12/2013 | Veteikis et al. | |
| 2014/0092807 A1 | 4/2014 | Zhao | |
| 2014/0098846 A1 | 4/2014 | Emmanuel et al. | |
| 2014/0229615 A1* | 8/2014 | Hsueh | H04L 67/568 |
| | | | 709/224 |
| 2014/0254647 A1 | 9/2014 | Stott et al. | |
| 2015/0029950 A1* | 1/2015 | Rath | H04W 76/00 |
| | | | 370/329 |
| 2015/0109941 A1 | 4/2015 | Zhang et al. | |
| 2015/0242294 A1 | 8/2015 | Lapierre et al. | |
| 2015/0253357 A1 | 9/2015 | Olgaard | |
| 2015/0271829 A1* | 9/2015 | Amini | H04W 24/02 |
| | | | 370/329 |
| 2016/0072594 A1 | 3/2016 | Yuan et al. | |
| 2016/0373944 A1 | 12/2016 | Jain et al. | |
| 2017/0077585 A1* | 3/2017 | Oxford | H01Q 3/06 |
| 2017/0135145 A1 | 5/2017 | Amini et al. | |
| 2017/0223559 A1* | 8/2017 | Kong | H04B 7/0413 |
| 2018/0006745 A1 | 1/2018 | Vanwiggeren | |
| 2019/0155327 A1 | 5/2019 | Zaidman et al. | |
| 2020/0008085 A1* | 1/2020 | Chakraborty | H04W 24/06 |
| 2020/0028905 A1 | 1/2020 | Chinitz et al. | |
| 2020/0029286 A1 | 1/2020 | Haley et al. | |
| 2020/0084645 A1* | 3/2020 | Jones | H04W 24/00 |
| 2020/0096547 A1* | 3/2020 | Orozco Valdes | G01R 29/0892 |
| 2021/0318369 A1* | 10/2021 | Rehammar | H01Q 3/02 |
| 2021/0359923 A1* | 11/2021 | Koyama | H04L 69/22 |

OTHER PUBLICATIONS

MCS Index and 7MCS Wi-Fi Experience Score, WiFi Fundamentals, 7signal.com, 6 pages (download Jan. 26, 2022 from https://www.7signal.com/info/mcs_).

* cited by examiner

| No. | Trase | Transmitter address | Receiver address | PVM type | MCS Channel index | Space Length | Short CI | Type/ Subtype | Protocol | Trigger Type | SSI Signal | Frame check |
|---|---|---|---|---|---|---|---|---|---|---|---|---|
| 302287 | 1.365929 | | 50:e0:85:87:49:89 | 802.11a | 5180 | 88 | | Clear-to-send | | | -6dBn, -174Bn, -6dBn | 0x11ce1183 |
| 302288 | 1.366508 | 2c:27:9e:91:5a:83 | ff:ff:ff:ff:ff:ff | 802.11a | 5180 | 198 | | Trigger | | Basic | -6dBn, -174Bn, -6dBn | |
| 302289 | 1.361221 | d8:a8:a5:84:7d:bc | 0c:a7:b5:92:5a:83 | 802.11a | 5180 | 318 | | Data | | | -57dBn, -61dBn, -57dBn | |
| 302290 | 1.361242 | c8:72:cd:84:3d:9c | ac:23:dc:d3:12:83 | 802.11a | 5180 | 318 | | QoS Data | | | -57dBn, -61dBn, -57dBn | |

↙1120

```
> User Info: 0x3221136e007
> Basic Trigger Dependent User Info: 0x64
v User Info: 0x352137a004
                                    0000 0000 0100 = AID12: 0x004
                          ...... ..0 .... .... .... = RU Allocation Region: Not used for 20, 40 or 80Hz
                      0111 103.  .... .... .... .... = RU Allocation: 61 (242 tones)
                    .......1 .... .... .... .... .... = UL FDC Coding Type: LDPC
                ...1 011. .... .... .... .... .... = UL MCS: 0xb
               ...0 .... .... .... .... .... .... = UL DCM: False
           ...0 00.. .... .... .... .... .... .... = Starting Spatial Stream: 1
          001. .... .... .... .... .... .... .... = Number of Spatial Streams: 2
    -011 0101 .... .... .... .... .... .... .... = Ul Target ASSI: -57dBn
  0... .... .... .... .... .... .... .... = Reserved: 0x0
> Basic Trigger Dependent User Info: 0x2a2131a006
v User Info: 0x2a2131a006
                                    0000 0000 0120 = AID12: 0x006
                          ...... ..0 .... .... .... = RU Allocation Region: Not used for 20, 40 or 80Hz
                      0001 101.  .... .... .... .... = RU Allocation: 13 (26 tones)
                    .......1 .... .... .... .... .... = UL FDC Coding Type: LDPC
                ...1 001. .... .... .... .... .... = UL MCS: 0x9
               ...0 .... .... .... .... .... .... = UL DCM: False
           ...0 00.. .... .... .... .... .... .... = Starting Spatial Stream: 1
          001. .... .... .... .... .... .... .... = Number of Spatial Streams: 2
    -010 1010 .... .... .... .... .... .... .... = Ul Target ASSI: -68dBn
  0... .... .... .... .... .... .... .... = Reserved: 0x0
> Basic Trigger Dependent User Info: 0x64
> User Info: 0x3123372005
> Basic Trigger Dependent User Info: 0x64
> User Info: 0x2f21374002
> Basic Trigger Dependent User Info: 0x64
> User Info: 0x3023376003
> Basic Trigger Dependent User Info: 0x64
```

MULTI-FUNCTIONAL WIRELESS LINK MONITOR

CROSS-REFERENCE TO RELATED APPLICATIONS

This application claims priority to U.S. Provisional Application No. 62/902,470, titled "Multi-Functional Wireless Link Monitor," filed on Sep. 19, 2019, which is hereby incorporated by reference.

TECHNICAL FIELD

This application relates generally to wireless device testing.

BACKGROUND

During wireless device testing, wireless link monitors operate in "monitor mode" to capture wireless traffic passing between two wireless devices. Various analysis tools can then be used to display data related to that traffic in a meaningful way. For example, assuming the wireless link monitor understands the protocols being used, the wireless link monitor can detect the data rate at which data is being sent, the throughput of the wireless link, packet loss, etc.

Wireless link monitors working in this way are acceptable for wireless devices that transmit their wireless signals broadly (e.g., in all directions). However, they do not work well for wireless devices that transmit their wireless signals narrowly (e.g., in a narrow beam between them), and they especially do not work well if that beam is constantly changing.

The current generation of mobile wireless technologies makes use of adaptive beamforming technologies in which the signal from the transmitter is constantly being adjusted so that it is pointed directly at the receiver device (e.g., due to relative movement of the receiver with respect to the transmitter). In such a scenario, a wireless monitor (e.g., a packet sniffer) will not be able to monitor the wireless link, because the wireless link will almost always be outside the narrow path of communication between the transmitter and receiver, for example as illustrated in FIG. 1.

It would be desirable to improve the testing of wireless devices that transmit their signals narrowly such as in adaptive beamforming technologies.

SUMMARY

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages and novel features of the disclosure will be set forth in the following detailed description of the disclosure when considered in conjunction with the drawings, which are intended to illustrate, not limit, the invention.

An aspect of the invention is directed to a test instrument for a wireless device-under-test (DUT), comprising: a processor; a radio in electrical communication with the processor; and non-volatile memory in electrical communication with the processor. The non-volatile memory stores computer-readable instructions that, when executed by the processor, cause the processor to: configure the test instrument to function simultaneously as an active client and as an inline wireless link monitor; establish a wireless communication link between the active client and the DUT; and capture wireless packets sent between the active client and the DUT using the inline wireless link monitor.

In one or more embodiments, the active client comprises a wireless access point (AP). In one or more embodiments, the active client comprises a wireless station. In one or more embodiments, the computer-readable instructions further cause the processor to generate a plot of a wireless communication link characteristic. In one or more embodiments, the wireless communication link characteristic includes a received signal strength indicator (RSSI), a data rate, a number of spatial streams, or a channel width. In one or more embodiments, the computer-readable instructions further cause the processor to generate a plot of a physical layer characteristic of the wireless packets.

In one or more embodiments, the wireless communication link comprises a Wi-Fi wireless communication link that is compliant with IEEE 802.11. In one or more embodiments, the Wi-Fi wireless communication link is compliant with IEEE 802.11ax. In one or more embodiments, the test instrument further comprises a common housing, wherein the processor, the radio, and the non-volatile memory are disposed in the common housing.

Another aspect of the invention is directed to a system for testing wireless devices, comprising: a plurality of RF-isolated chambers; and a plurality of test instruments, in network communication with each other, each test instrument disposed in a respective RF-isolated chamber. Each test instrument comprises: a processor; a radio in electrical communication with the processor; and non-volatile memory in electrical communication with the processor. The non-volatile memory stores computer-readable instructions that, when executed by the processor, cause the processor to: configure the test instrument to function simultaneously as an active client and as an inline wireless link monitor; establish a wireless communication link between the active client and a device-under-test (DUT) in the respective RF-isolated chamber; and capture wireless packets sent between the active client and the DUT using the inline wireless link monitor. Each test instrument has an internal clock, and the internal clocks are time-synchronized according to a time synchronization protocol.

In one or more embodiments, the system further comprises a computer in network communication with the test instruments, wherein: the computer receives the wireless packets from each test instrument, and the computer merges the wireless packets using the synchronized internal clocks to provide synchronized merged wireless packets. In one or more embodiments, the internal clocks of the test instruments are synchronized to an internal clock of the computer. In one or more embodiments, each DUT is configured to communicate using orthogonal frequency domain multiple access (OFDMA), and the computer comprises: a processor; and non-volatile memory in electrical communication with the processor. The non-volatile memory stores computer-readable instructions that, when executed by the processor, cause the processor to generate a plot of a wireless communication link characteristic for each DUT using the synchronized merged wireless packets. In one or more embodiments, the wireless communication link characteristic includes a received signal strength indicator (RSSI), a data rate, a number of spatial streams, a channel width, or a modulation and coding scheme (MCS) index value. In one or more embodiments, the plot indicates a resource unit allocated for each DUT.

In one or more embodiments, the active client of each test instrument comprises a wireless access point (AP) or a wireless station. In one or more embodiments, the time synchronization protocol comprises a clock synchronization protocol. In one or more embodiments, the clock synchronization protocol comprises a Network Time Protocol or a Precision Time Protocol. In one or more embodiments, each test instrument further comprises a respective common housing and the processor, radio, and non-volatile memory of each test instrument is disposed in the respective common housing.

Yet another aspect of the invention is directed to a test instrument for a wireless device-under-test (DUT), comprising: a processor; a radio in electrical communication with the processor; and non-volatile memory in electrical communication with the processor. The non-volatile memory stores computer-readable instructions that, when executed by the processor, cause the processor to: configure the test instrument to function simultaneously as an active client and as an inline wireless link monitor; establish a wireless communication link between the active client and the DUT; capture wireless packets sent between the active client and the DUT using the wireless link monitor; generate a plot of a wireless communication link characteristic; and when a user selects a data point on the plot, automatically display wireless packet data that corresponds to the data point.

In one or more embodiments, the computer-readable instructions further cause the processor to automatically display the wireless packet data in a new window. In one or more embodiments, the active client comprises a wireless access point (AP). In one or more embodiments, the active client comprises a wireless station. In one or more embodiments, the computer-readable instructions further cause the processor to generate a plot of a wireless communication link characteristic. In one or more embodiments, the wireless communication link characteristic includes a received signal strength indicator (RSSI), a data rate, a number of spatial streams, or a channel width. In one or more embodiments, the computer-readable instructions further cause the processor to generate a plot of a physical layer characteristic of the wireless packets.

Another aspect of the invention is directed to a system for testing wireless devices, comprising: a test instrument; an RF-isolated chamber; and a plurality of antenna positioners. The test instrument comprises a processor; a radio in electrical communication with the processor; and a plurality of antennas, each antenna in electrical communication with the radio. Each antenna positioner is mounted on an internal wall of the RF-isolated chamber to adjustably position a respective antenna with multiple degrees of freedom.

In one or more embodiments, each antenna positioner has a first degree of freedom to adjustably position the respective antenna with respect to a vertical axis. In one or more embodiments, each antenna positioner has a second degree of freedom to adjustably position the respective antenna with respect to a horizontal axis. In one or more embodiments, each antenna positioner has a third degree of freedom to adjustably position the respective antenna with respect to an angular direction, the angular direction measured with respect to the vertical axis and/or the horizontal axis.

In one or more embodiments, the angular direction is measured with respect to the vertical axis and the horizontal axis.

In one or more embodiments, each antenna positioner includes: a shaft having a height that extends parallel to the vertical axis, the shaft attached to the internal wall; a mounting bar that is adjustably mounted along the height of the shaft, the mounting bar having a length that extends parallel to the horizontal axis; and an antenna support that is adjustably positioned along the length of the mounting bar, the respective antenna attached to the antenna support. In one or more embodiments, the antenna support is pivotably adjustable with respect to the mounting bar to provide the third degree of freedom.

In one or more embodiments, the system further comprises a device-under-test (DUT) having a plurality of DUT antennas, wherein each antenna positioner is adjustable, using the multiple degrees of freedom, to align the respective antenna of the test instrument with a respective DUT antenna to thereby approximate a signal received by the DUT using the DUT antennas.

BRIEF DESCRIPTION OF THE DRAWINGS

For a fuller understanding of the nature and advantages of the present concepts, reference is made to the detailed description of preferred embodiments and the accompanying drawings.

FIG. 11B illustrates an example of wireless packet data.

DETAILED DESCRIPTION

Figure 1:
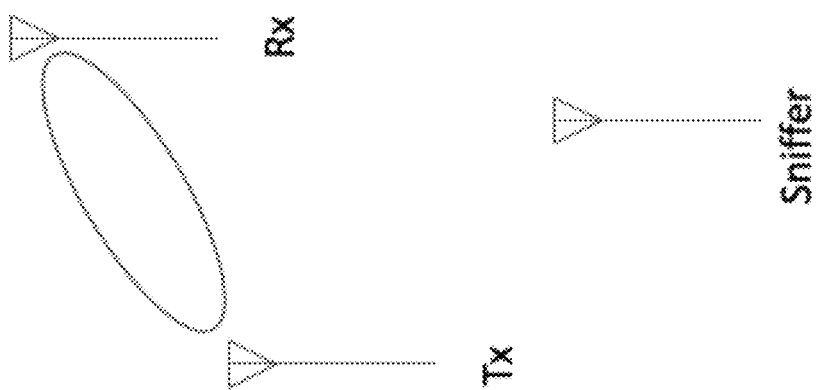
FIG. 1 is a block diagram of a wireless testing apparatus according to the prior art.
Figure 2:
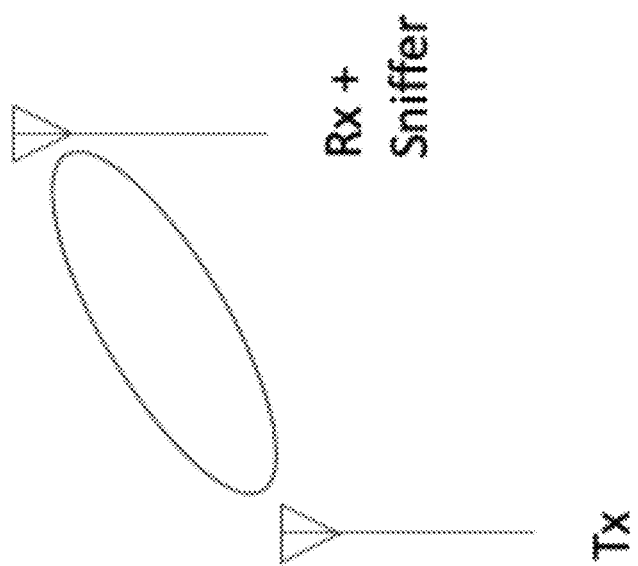
FIGS. 2 and 3 are block diagrams of a wireless testing apparatus according to an embodiment.
Figure 3:
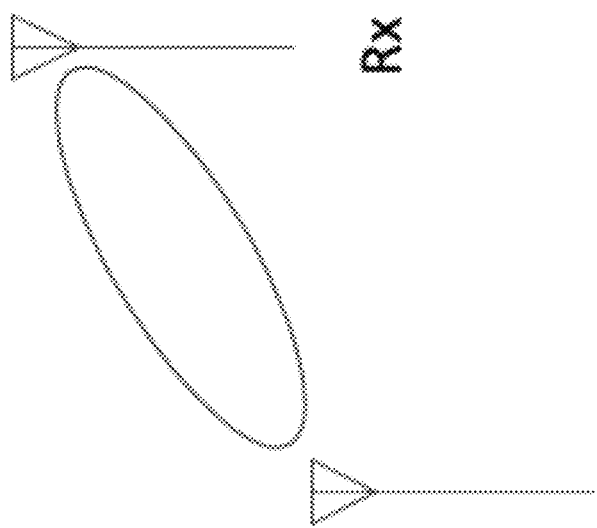

A wireless link monitor is configured to operate as an active client that can send and/or receive wireless traffic to and/or from wireless devices-under-test (DUTs) in the network. When the wireless link monitor operates as an active client (e.g., as an access point (AP) or as a station, the DUTs can send respective wireless traffic to the wireless link monitor. This ensures that the wireless link monitor receives the wireless traffic even when the DUTs transmit their wireless signals narrowly (e.g., in adaptive beamforming technologies), for example as illustrated in FIG. 2. The wireless link monitor continues to receive wireless traffic from the DUT even when the wireless link monitor and/or the transmitting DUT change positions, for example as illustrated in FIG. 3 where the wireless link monitor is configured as an AP. Thus, the wireless link monitor can function simultaneously as an active client (e.g., as an AP or as a station) and as a testing device (e.g., an inline wireless link monitor).

Figure 4:
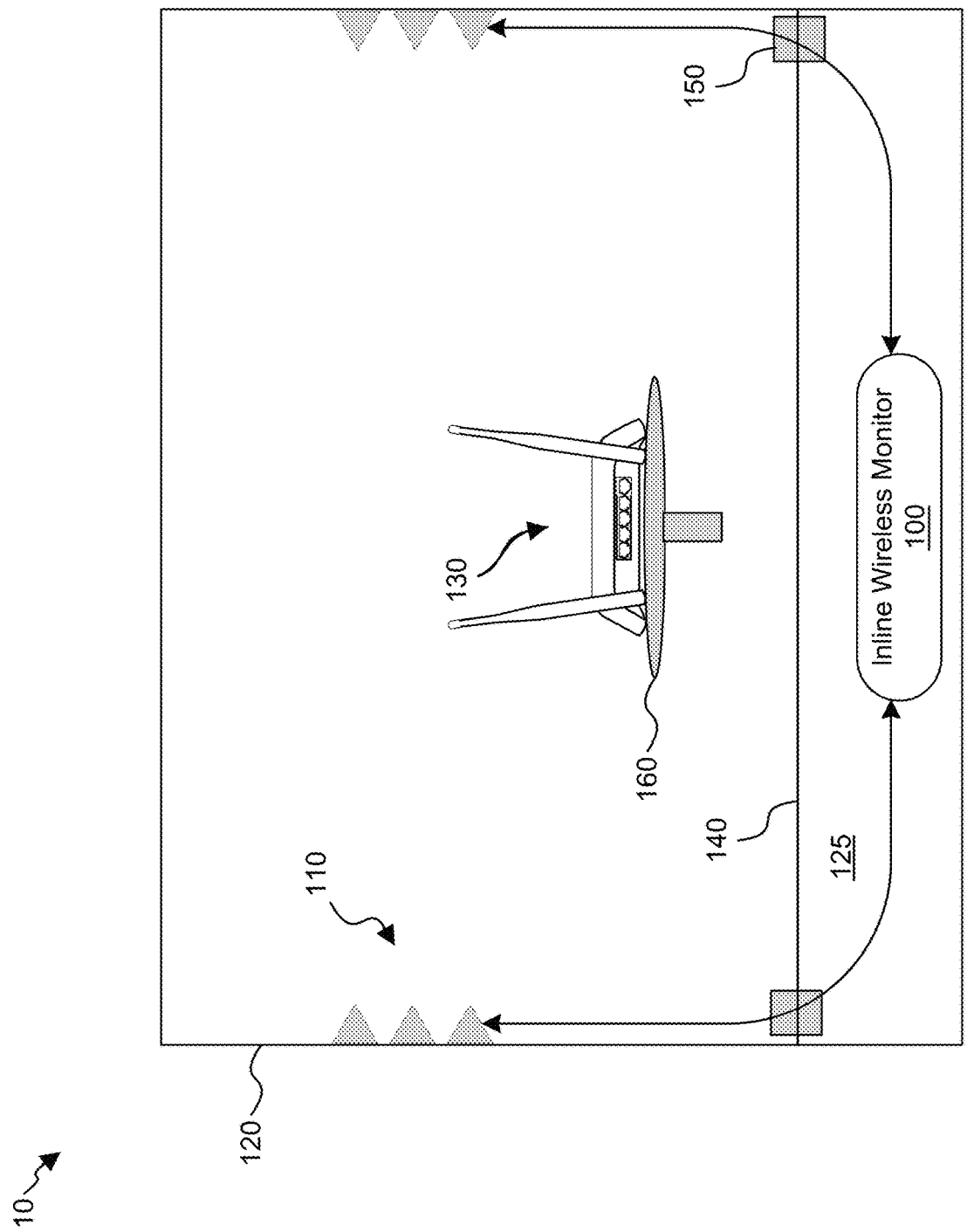
FIG. 4 illustrates a system for wireless devices testing according to an embodiment.
Figure 16:
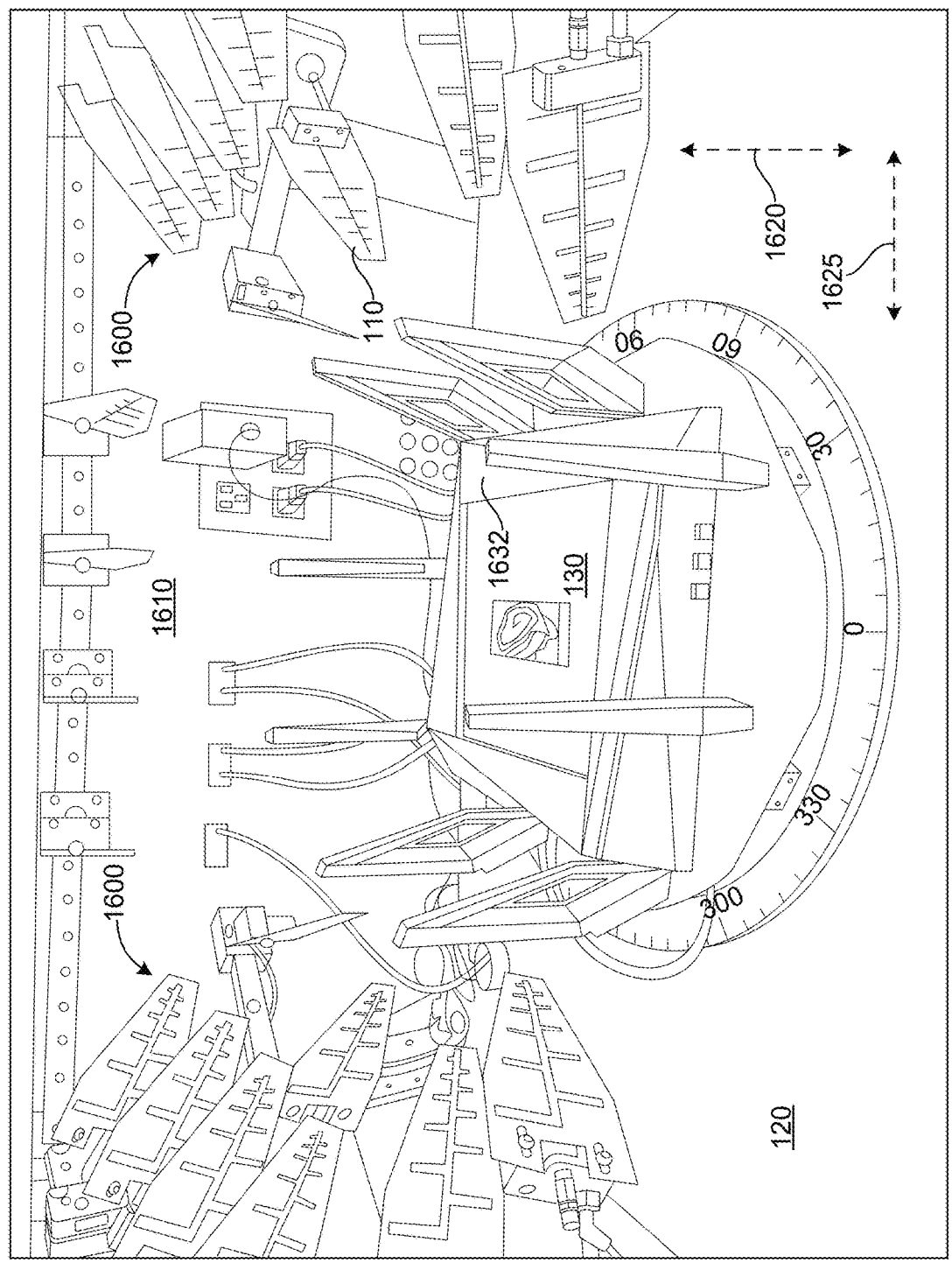
FIG. 16 is a perspective view of adjustable antenna positioners in an electromagnetically-isolating test chamber according to an embodiment.
Figure 17:
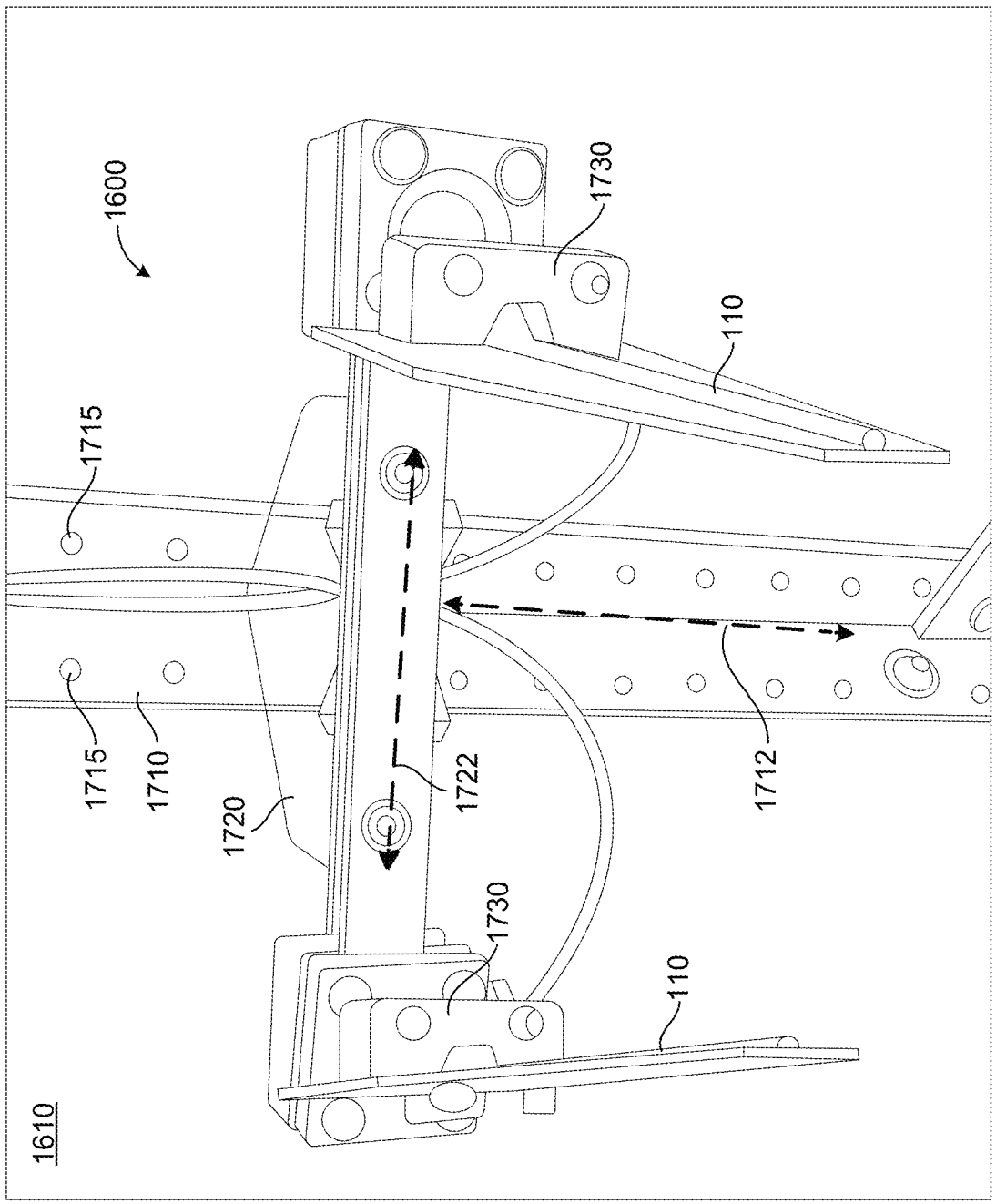
FIG. 17 is a detailed view of one of the antenna positioners illustrated in FIG. 16.

The wireless link monitor can be disposed in or integrated into an electromagnetically-isolating chamber to test a DUT. For example, FIG. 4 illustrates a system 10 for wireless devices testing according to an embodiment. The system 10 includes a wireless link monitor 100 that is electrically coupled to internal antennas 110 in an electromagnetically-isolating test chamber 120. Some or all of the internal antennas 110 can be mounted on respective adjustable antennas positioners, as illustrated in FIGS. 16 and 17 (described below). The internal antennas 110 allow the wireless link monitor 100 to be in signal communication (e.g., via wired and wireless communication links) with a DUT 130 in the electromagnetically-isolating test chamber 120. The wireless link monitor 100 is in an electromagnetically-isolating sub-chamber 125 that is separated from electromagnetically-isolating test chamber 120 by an internal wall 140. RF feedthrough ports 150 in the internal wall 140 allow the wireless link monitor 100 to be in wired communication with the internal antennas 110. The DUT 130 can optionally be placed on a turntable 160 that can rotate during testing.

An example of a wireless link monitor is the PAL®-6 test instrument, (available from octoScope, Inc), which is a Wi-Fi 6 (IEEE 802.11ax) test instrument. An example of an electromagnetically-isolating chamber is the OCTOBOX®, available from octoScope, Inc. Additional details of the OCTOBOX® are described in U.S. Patent Application Publication No. 2013/0033279, titled "Electromagnetic Test Enclosure," published on Feb. 7, 2013, which is hereby incorporated by reference.

Figure 5:
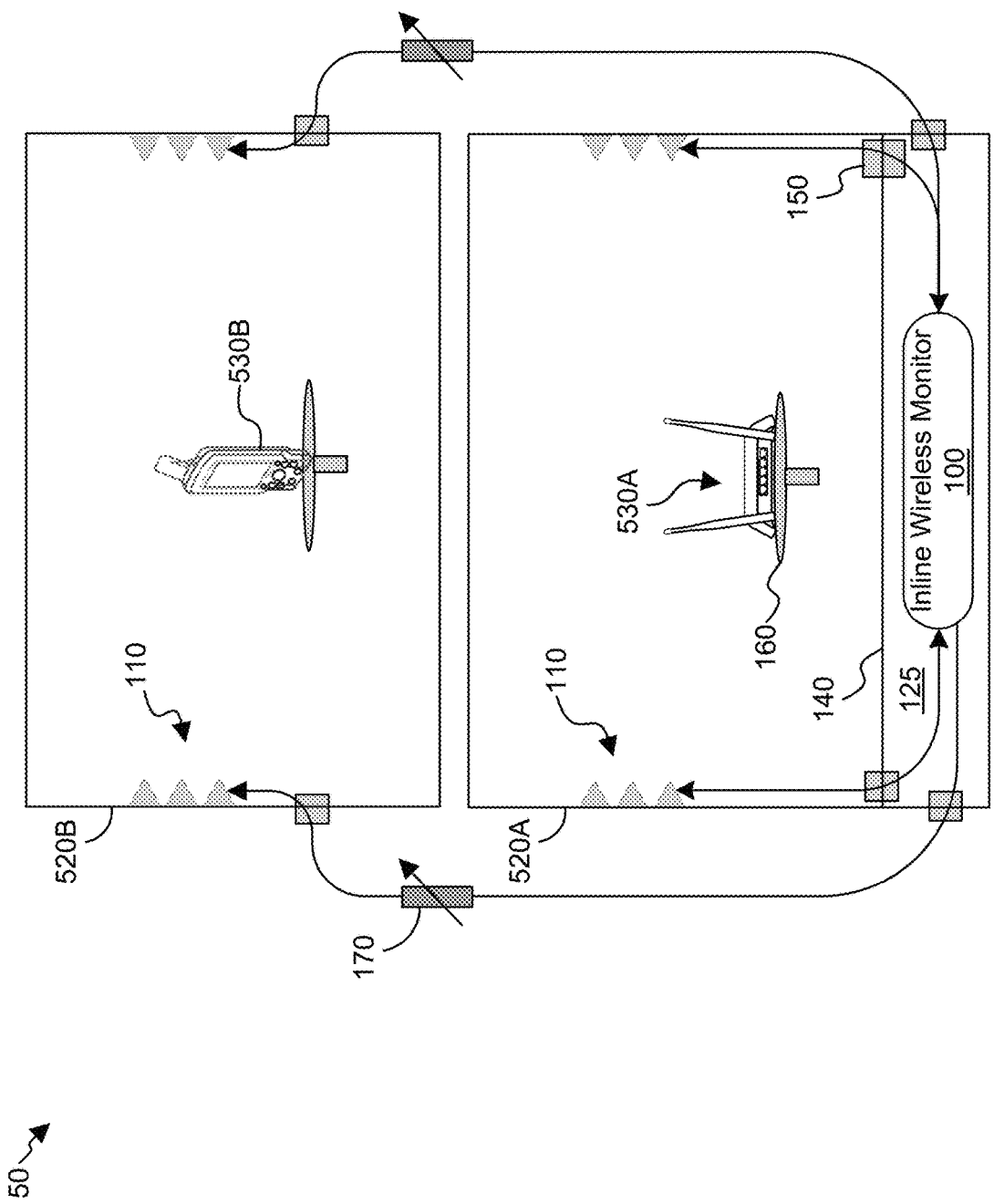
FIG. 5 illustrates a system for wireless devices testing according to another embodiment.

FIG. 5 illustrates a "STACK-MIN" wireless testing system configuration 50 according to an embodiment. In wireless testing system configuration 50, the wireless link monitor 100 is electrically coupled to internal antennas 110 in more than one electromagnetically-isolating chamber, such as in electromagnetically-isolating chambers 520A, 520B. Programmable attenuators 170 can be electrically coupled between the wireless link monitor 100 and the internal antennas 110 in one of the electromagnetically-isolating chambers, such as in electromagnetically-isolating chamber 520B. Respective DUTs 530A, 530B can be disposed in each electromagnetically-isolating chamber 520A, 520B. In some embodiments, a plurality of wireless link monitors can be disposed in a corresponding plurality of electromagnetically-isolating chambers.

The wireless testing system 50 can be used to perform one or more of the following tests: (a) rate vs. range (RvR), (b) RvR with rotation, (c) rate vs. range vs. orientation (RvRvO) or rate vs. orientation vs. range (RvOvR) using optional turntable 160, (d) band steering, (e) packet capture, (f) test synchronization with a radio-frequency (RF) analyzer (e.g., as disclosed is U.S. patent application Ser. No. 16/515,809, titled "System and Method for Synchronizing Protocol and RF Analyzers During Wireless Testing," filed on Jul. 18, 2019, which is hereby incorporated by reference).

Figure 6:
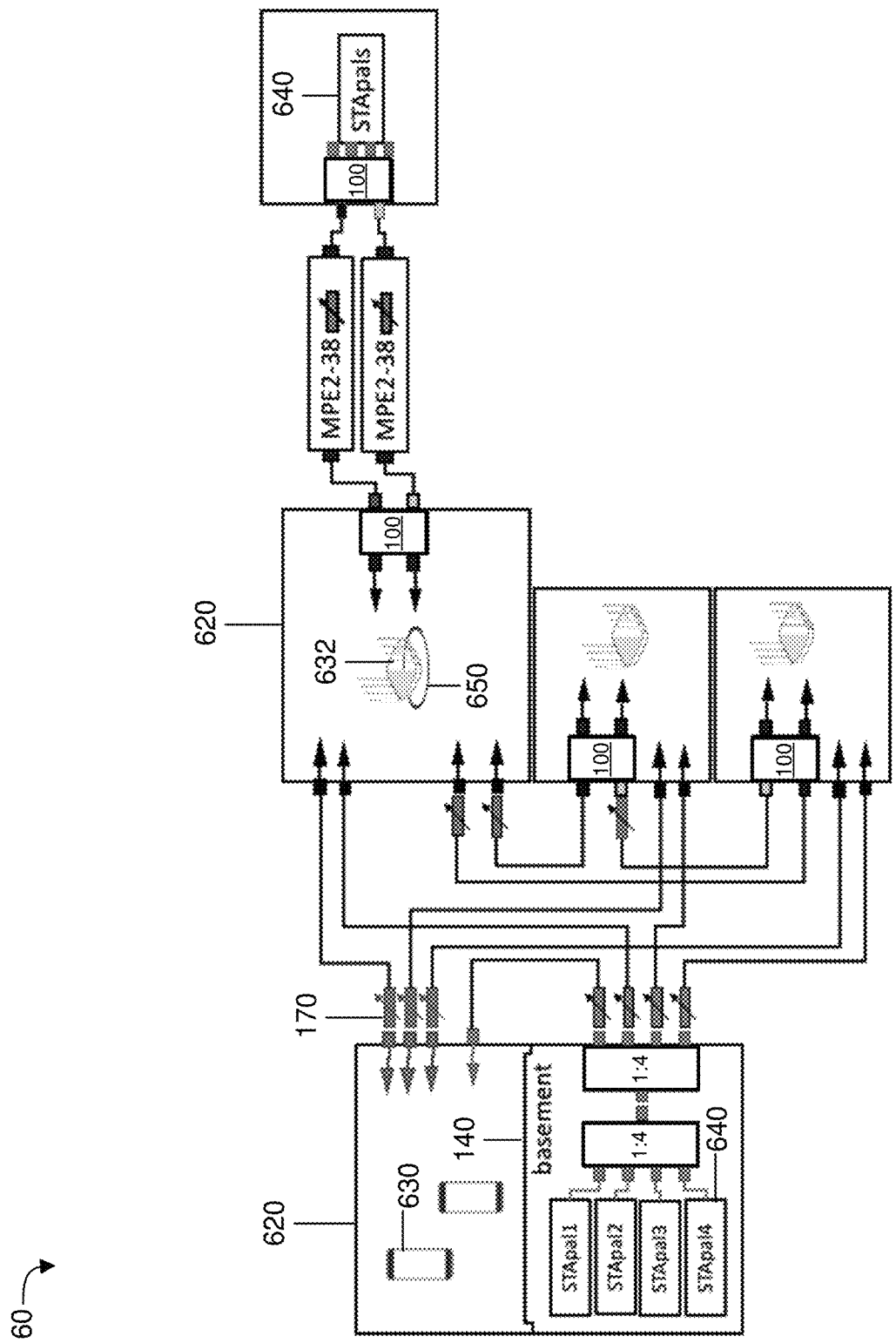
FIG. 6 illustrates a "STACK-MAX" wireless testing system configuration according to an embodiment.

FIG. 6 illustrates a "STACK-MAX" wireless testing system configuration 60 according to an embodiment. In wireless testing system configuration 60, wireless link monitors 100 are disposed in respective electromagnetically-isolating chambers 620 to test DUTs 630, 632. A plurality of STApals 640 are disposed in one or more electromagnetically-isolating chambers 620. The STApals 640 can be the same as or different than the wireless link monitors 100. At least one of the electromagnetically-isolating chambers 620 can include an optional turntable 650 to rotate a DUTs (e.g., DUT 632) during testing. The wireless testing system 60 can be used to perform one or more of the following tests: (a) 15 PAL®-6 test instrument-based stations (STAs) to 1 AP orthogonal frequency domain multiple access (OFDMA) throughput (RvR, RvR with rotation, RvRvO, RvOvR); (b) multiple resource units (RUs) in the 5 GHz band (e.g., using wireless link monitor 100 radios in the 5 GHz band) and multiple RUs in the 2.4 GHz band (e.g., wireless link monitor 100 radios in the 2.4 GHz band); add real STAs 630 for more RUs (e.g., using the STApal(s) 640); (c) 8×8 multiple-input-multiple-output (MIMO) with multipath; (d) OFDMA sniffing with time-synchronized wireless link monitors 100 (e.g., a probe antenna of the wireless link monitor(s) 100) on each of the STAs 630 and on the AP 632 rendering complete distributed monitoring of an OFDMA link; (e) 3-node mesh testing (self-forming, self-healing, throughput vs. hops); (f) roaming; (g) band steering; (h) packet capture; and/or (i) test synchronization with an RF analyzer.

Figure 7:
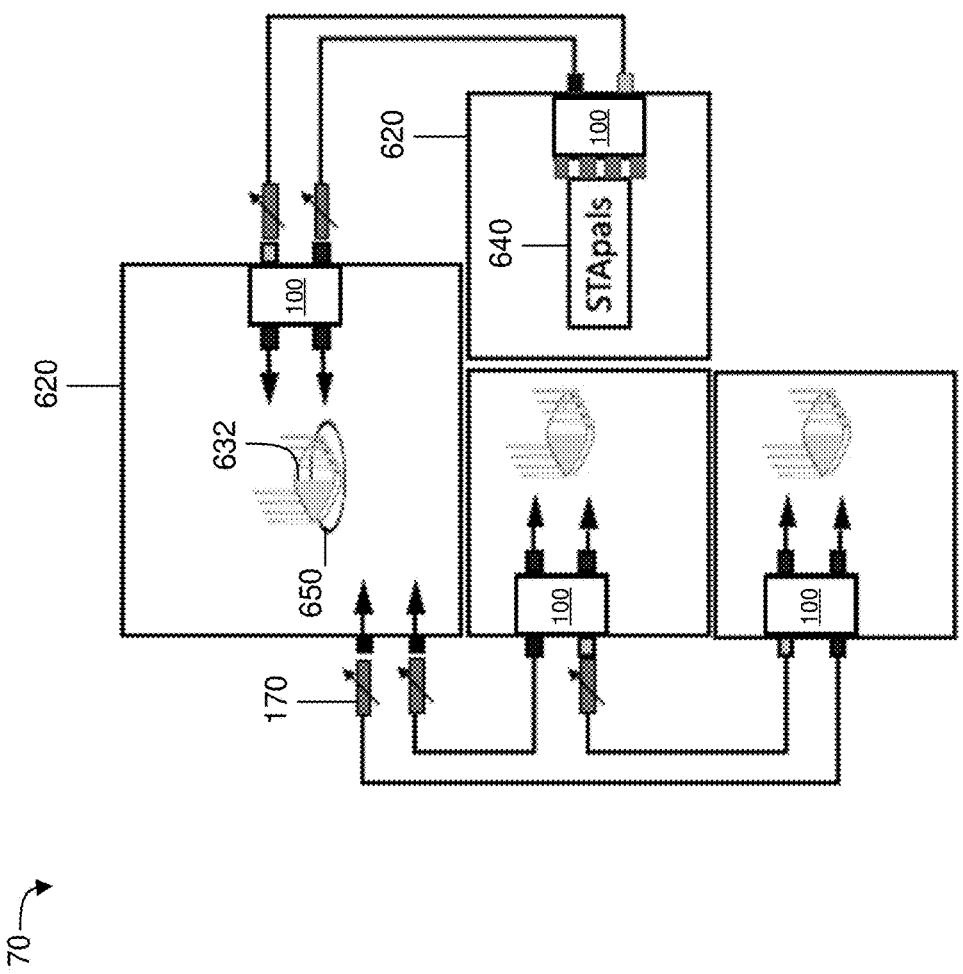
FIG. 7 illustrates a "STACK-MID" wireless testing system configuration according to an embodiment.

FIG. 7 illustrates a "STACK-MID" wireless testing system configuration 70 according to an embodiment. The wireless testing system 70 can support multiple OFDMA RUs based on the wireless link monitor 100 radios in the 5 GHz band and multiple RUs based on the wireless link monitor 100 radios in the 2.4 GHz band. More RUs can be added to each band by placing real STAs 630 into the electromagnetically-isolating chambers (e.g., using the STApal(s) 640). The "STACK-MID" wireless testing configuration 70 falls between the "STACK-MAX" 60 and "STACK-MIN" system 50 configurations in complexity.

Figure 8:
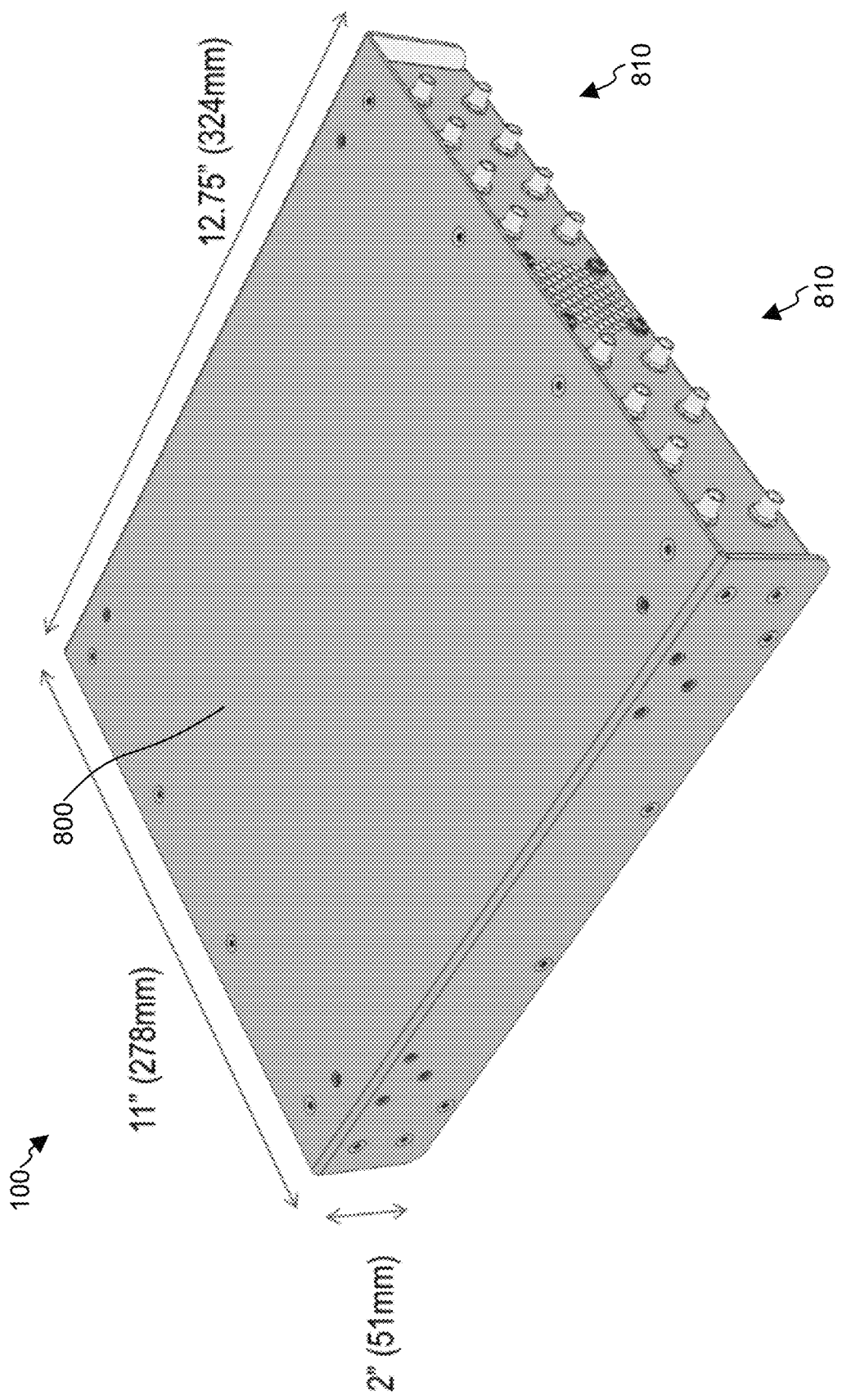
FIG. 8 is a perspective view of a wireless link monitor according to an embodiment.

FIG. 8 is a perspective view of the wireless link monitor 100 according to an embodiment. The wireless link monitor 100 includes a common housing 800 that encloses the electrical components. Ports 810 for Wi-Fi and Bluetooth wired connections are located on one side of the housing 800. The dimensions illustrated in FIG. 8 are provided as examples.

Figure 9:
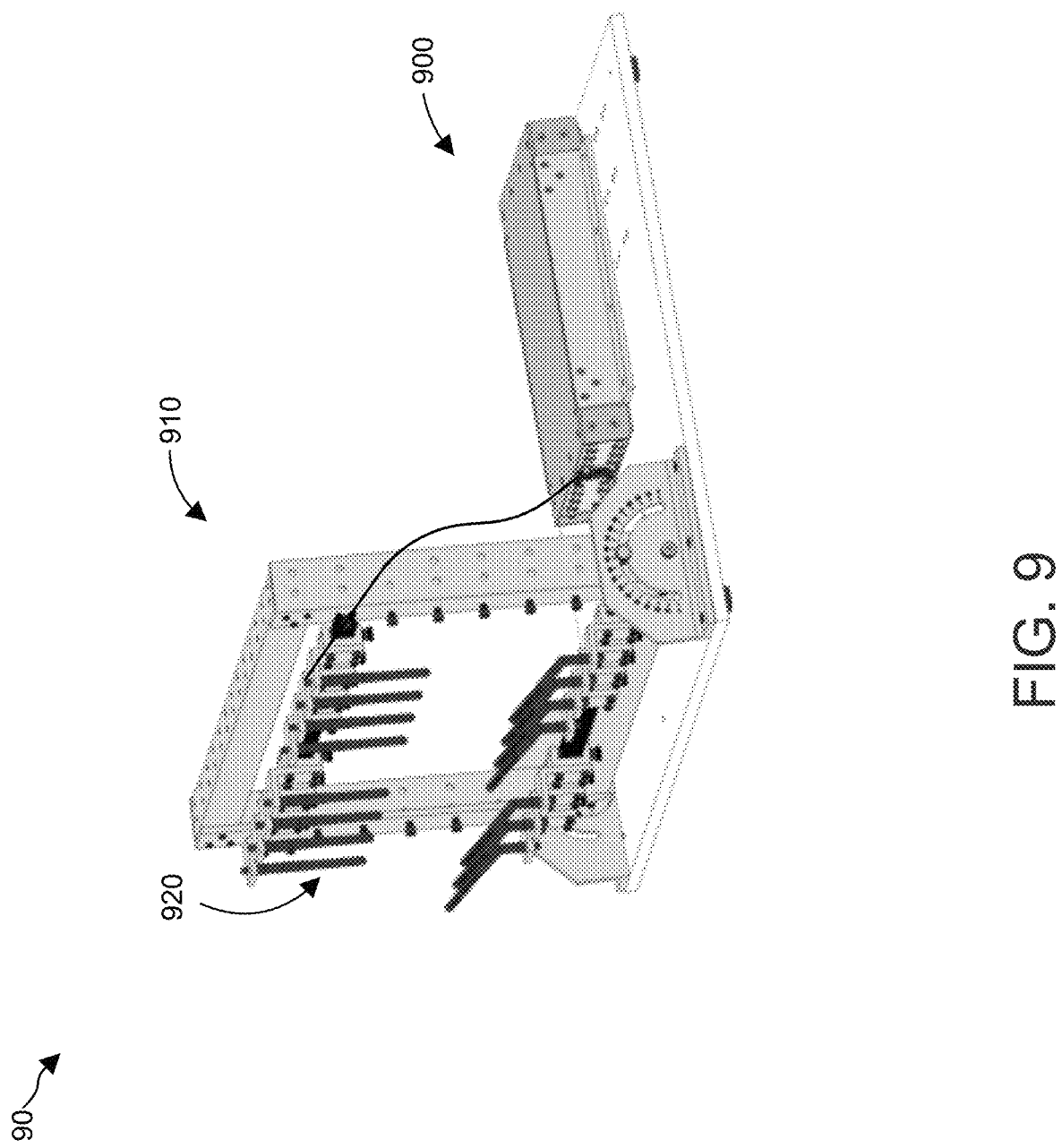
FIG. 9 is a perspective view of a system for open-air wireless device testing according to an embodiment.

FIG. 9 is a perspective view of a system 90 for open-air wireless device testing according to an embodiment. The system 90 includes a wireless link monitor 900 that is electrically coupled (e.g., via a wired connection) to an antenna assembly 910. Wireless link monitor 900 can be the same as wireless link monitor 100. The antenna assembly 910 includes a plurality of antennas 920. The antennas 920 can be rotated individually or in groups to a desired angular position. System 90 can be used in an open-air test environment, such as a test house.

Figure 10:
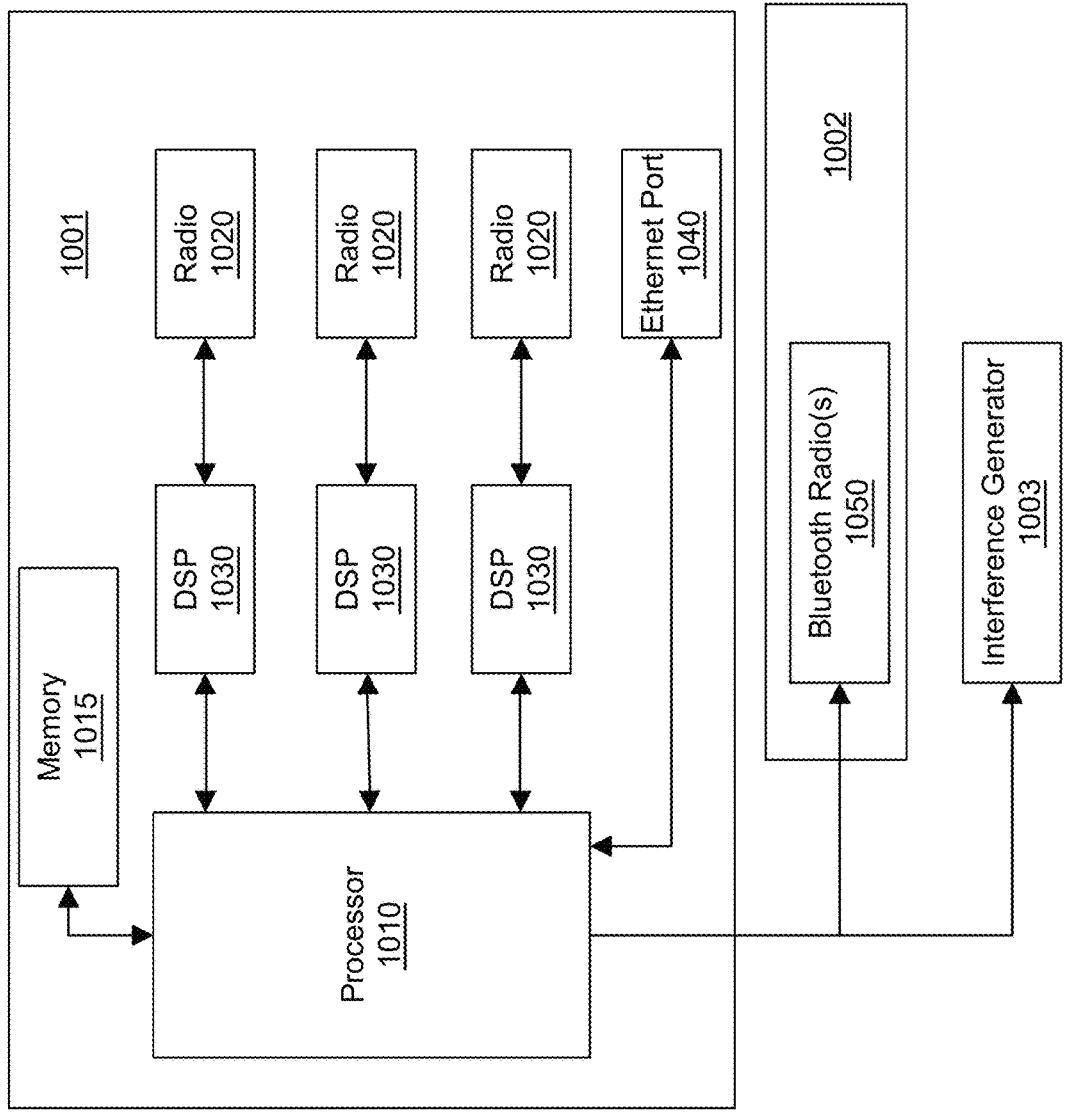
FIG. 10 is a block diagram of a wireless link monitor according to an embodiment.

FIG. 10 is a block diagram of a wireless link monitor 1000 according to an embodiment. Wireless link monitor 1000 can be the same as wireless link monitor 900 and/or 100.

The wireless link monitor 1000 includes a Wi-Fi chipset 1001, an optional Bluetooth chipset 1002, and an optional interference generator 1003. The Wi-Fi chipset 1001 can include a system-on-a-chip (SoC), such as the Hawkeye QCN5054/QCN5024 available from Qualcomm Inc., a system-on-a-package, or a plurality of chips. The Wi-Fi chipset 1001 can be compatible with IEEE 802.11ax (e.g., Wi-Fi 6) and can be backwards compatible with prior IEEE 802.11 standards, such as 802.11a/b/g/n/ac. The Wi-Fi chipset 1001 includes a processor 1010, memory 1015, radios 1020 (e.g., transceivers), digital signal processors 1030, and an ethernet port 1040.

The processor 1010 comprises a hardware-based microprocessor that can include a plurality of cores. The processor 1010 is electrically coupled to memory 1015, which can include non-transitory memory. The memory 1015 stores computer-readable instructions that can be executed by the processor 1010 to perform one or more functions or tasks as described herein. For example, the memory 1015 includes computer-readable instructions that allow the wireless link monitor 1000 to be configured to function simultaneously as an active client and as an inline wireless link monitor using the hardware circuitry (e.g., the same processor 1010).

The radios 1020 can include two 5 GHz radios and a 2.4 GHz radio. The 5 GHz radios can support testing in the IEEE 802.11a/n/ac/ax protocols. For example, the 5 GHz radios can support up to 8×8 MIMO in channels of up to 80 MHz, or 4×4 MIMO in 80+80 (i.e., two radios operating in separate 80 MHz channels) or 160 MHz channels. The 2.4 GHz radio can support testing in the IEEE 802.11b/g/n/ac/ax protocols. For example, the 2.4 GHz radio can support up to 4×4 MIMO. In some embodiments, the radios 1020 can function as sniffers and/or expert analyzers.

The Ethernet port 1040 can comprise a 10 Gb Ethernet (GbE) port that can address the high bandwidth requirements of 802.11ax for measuring data throughput. Trigger signals can also be sent or received through the Ethernet port 1040, for example to time synchronize the wireless link monitor 1000 with other wireless link monitors.

The driver and firmware for the Wi-Fi chipset 1001 can be accessed (e.g., via an API) to configure the wireless link monitor 1000 to function as a real device (e.g., as an active client for inline testing) and/or as a test instrument (e.g., as a passive testing device in monitor mode). The wireless link monitor 1000 can function as a traffic partner, an expert analyzer, a virtual station emulator, and/or a load generator for testing throughput, capacity, roaming, band steering, and more. As a real device, the wireless link monitor 1000 can function as a traffic partner running station and/or AP (access point) drivers. For example, the wireless link monitor 1000 can be configured as one or more APs (e.g., as an active client(s)) that can be traffic partners to a station-under-test.

As a test instrument, the wireless link monitor 1000 can emulate virtual stations (vSTAs) for testing APs under heavy traffic load from multiple stations, can act as multiple APs to a station-under-test, can perform expert monitoring and analysis, can replay captured traffic, and/or can operate as a packet sniffer. For example, to test band steering, the wireless link monitor 1000 can function at a set data rate, bandwidth, and/or number of streams. To test receiver sensitivity, the wireless link monitor 1000 can operate at a fixed modulation coding scheme. The wireless link monitor 1000 can test AP performance or emulate a realistic network with multi-station traffic by emulating up to 64 vSTAs (per-radio (e.g., up to 192 virtual stations per wireless link monitor 1000 with 3 radios). Real-life traffic can be bridged from the Ethernet interface via each vSTA to test video, voice, and data performance with different priority and security settings.

Figure 11A:
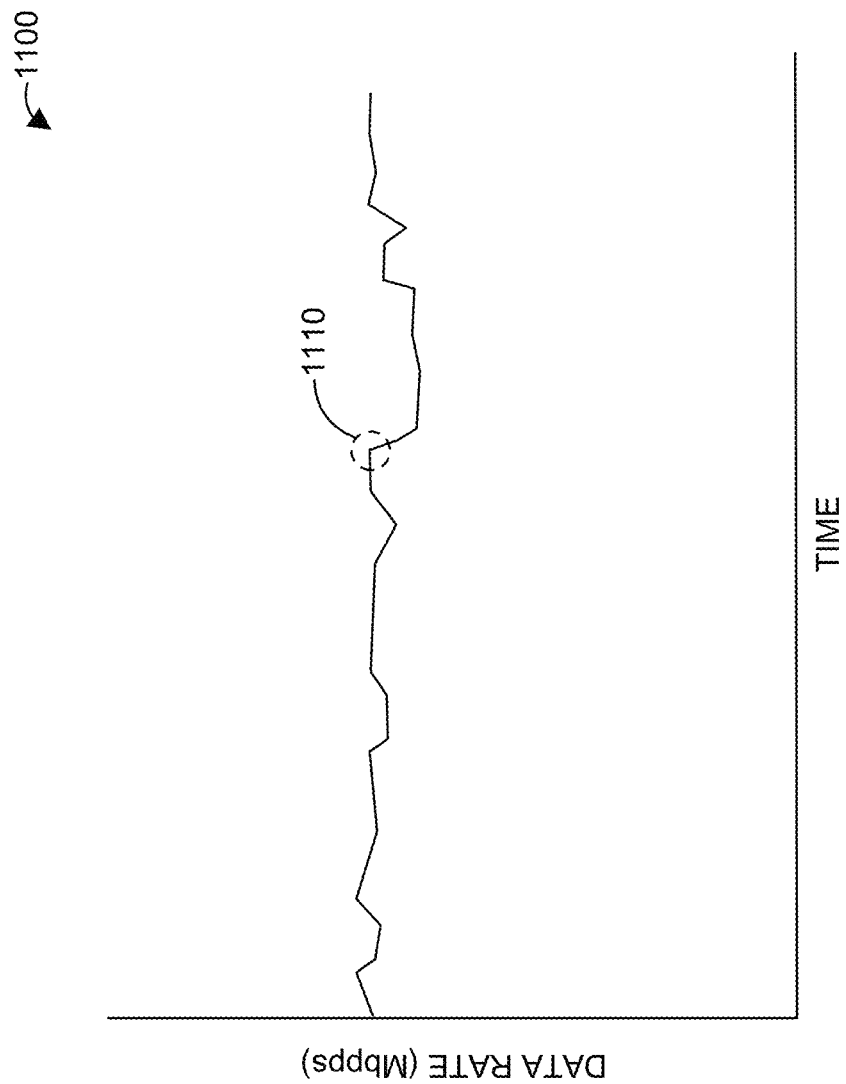
FIG. 11A illustrates an example wireless testing plot.

As an expert analyzer, the wireless link monitor 1000 can be used to show adaptation behavior of modern Wi-Fi systems. It can monitor and plot RSSI (received signal strength indicator), data rate, number of spatial streams, channel width, and other physical layer information. The plots can be available through a user-selectable menu. An example plot 1100 of data rate versus time is illustrated in FIG. 11A. In some embodiments, the data points on the plots are user-selectable (e.g., using a mouse). Selecting a data point 1110 can cause the computer to automatically display the wireless packet data that corresponds to the data point. The wireless packet data (e.g., in PCAP format) can be displayed in a new window, tab, or in the same screen as the plot. An example of wireless packet data 1120 that can be displayed when the user selects a data point 1110 is illustrated in FIG. 11B.

The wireless link monitor 1000 can capture and stream packets in PCAP format to a packet analyzer (e.g., Wireshark) in real-time. Each radio 1020 on the wireless link monitor 1000 can be synchronized with the radios on the same or other wireless link monitors through a time-synchronization protocol such as precision time protocol (PTP). The captures from each antenna in the electromagnetically-isolating chamber are combined in a common PCAP file viewable in the packet analyzer (e.g., Wireshark) for easy analysis. This allows data captures to be identified by probe (e.g., antenna). Such a common view of the different points in the electromagnetically-isolating chamber helps analyze complex band steering, roaming, and mesh behavior in the presence of motion, interference, path loss, multipath, and variable orientation of the DUT. This capability is particularly helpful when testing OFDMA links with multiple stations operating on different RUs because a single sniffer can only monitor a single RU. For an OFDMA link with 4 stations, you may need 4 sniffer probes, one on each station. When placed inside an electromagnetically-isolating chamber, each of the OFDMA stations can be monitored by a dedicated built-in wireless link monitor. The sniffer captures from each electromagnetically-isolating chamber are then aggregated, by time-synchronizing the wireless link monitors, for powerful analysis of the entire complex OFDMA link.

Figure 18:
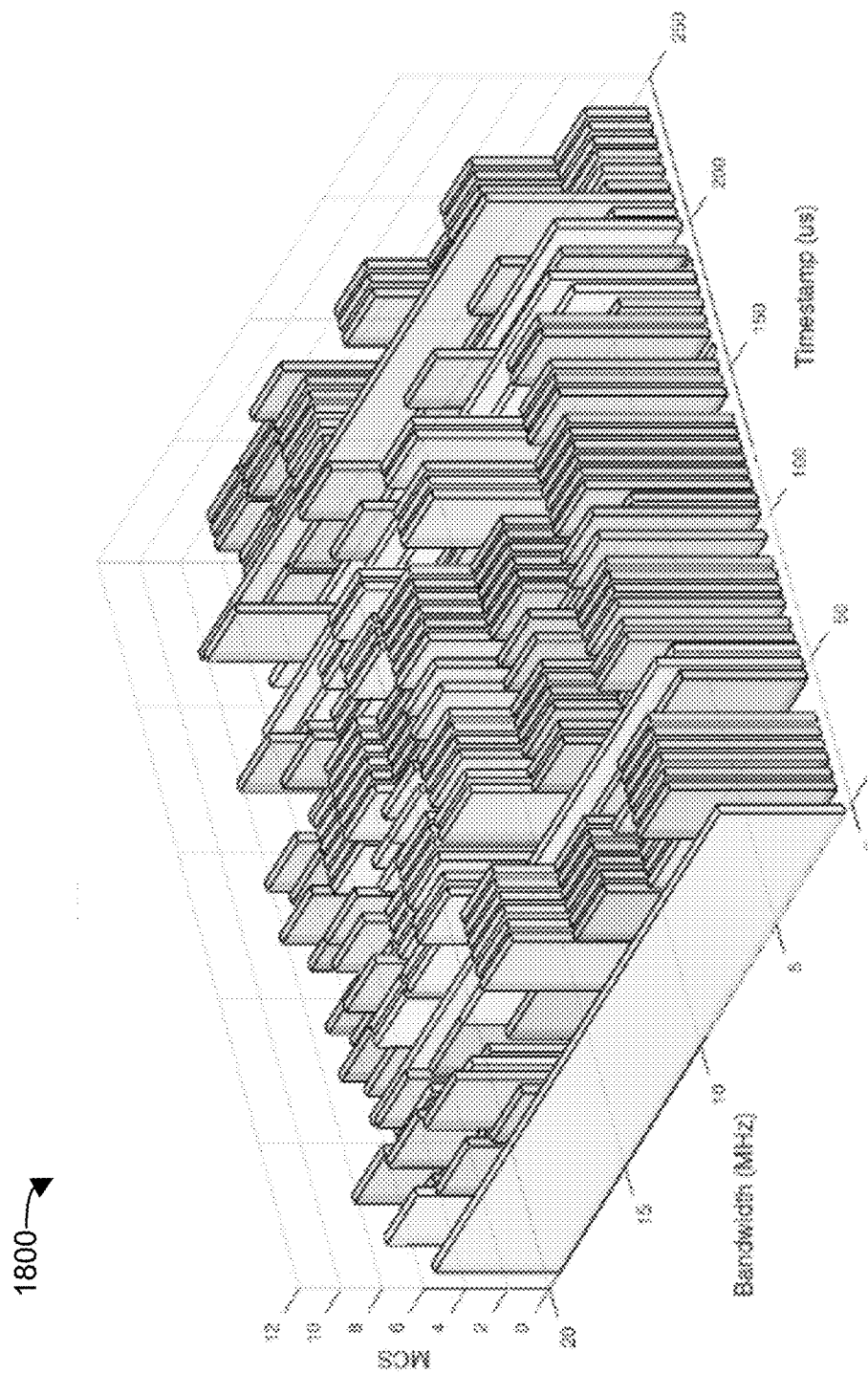
FIG. 18 illustrates an example of a three-dimensional plot of a wireless communication link characteristic for multiple DUTs using OFDMA.

An example of a three-dimensional plot 1800 of a wireless communication link characteristic for multiple DUTs using OFDMA is illustrated in FIG. 18. The wireless communication link characteristic for each DUT is captured using multiple time-synchronized wireless link monitors. In FIG. 18, the wireless communication link characteristic is the modulation and coding scheme (MCS) index value, which is then sorted (e.g., color-coded) by the RU allocated for the respective DUT. Other examples of wireless communication link characteristics that can be plotted include RSSI, data rate, number of spatial streams, and/or channel width, The plot can be generated by a computer in network communication with the time-synchronized wireless link monitors, for example using system 1400 described below.

The wireless link monitor 1000 can be extended with the optional Bluetooth chipset 1002, which can be an optional Bluetooth plug-in module, to integrate Bluetooth test capabilities.

The Bluetooth chipset 1002 can include a system-on-a-chip (SoC), such as the Cypress CYW20719 available from Cypress Semiconductor Corp., or a system-on-a-package. The Bluetooth chipset 1002 includes one or more radios 1050 (e.g., transceivers) that can support Bluetooth testing (e.g., Bluetooth 5 (BT5)), basic rate (BR), enhanced data rate (EDR) (e.g., 2 and/or 3 Mbps), Bluetooth low energy (BLE), synchronous-connection-oriented (SCO) channel, and/or extended SCO (eSCO). The Bluetooth chipset 1002 can be used to test Bluetooth-enabled DUTs and to capture sniffer traces.

Testing using the Bluetooth chipset 1002 can include (a) pairing tests of BT5, BLE, EDR and legacy BT devices, (b) master and slave modes for pairing and traffic testing, (c) BT sniffer on 2 BT radios simultaneously, synchronized with captures from Bluetooth or Wi-Fi radios on any PAL®-6 test instrument, (d) BT traffic partner to the DUT, (e) HID (human interface device) latency, (f) AFH (adaptive frequency hopping) map, (g) configurable packet size, (h) simultaneous BT and Wi-Fi traffic, and (i) powerful test automation API.

Figure 12:
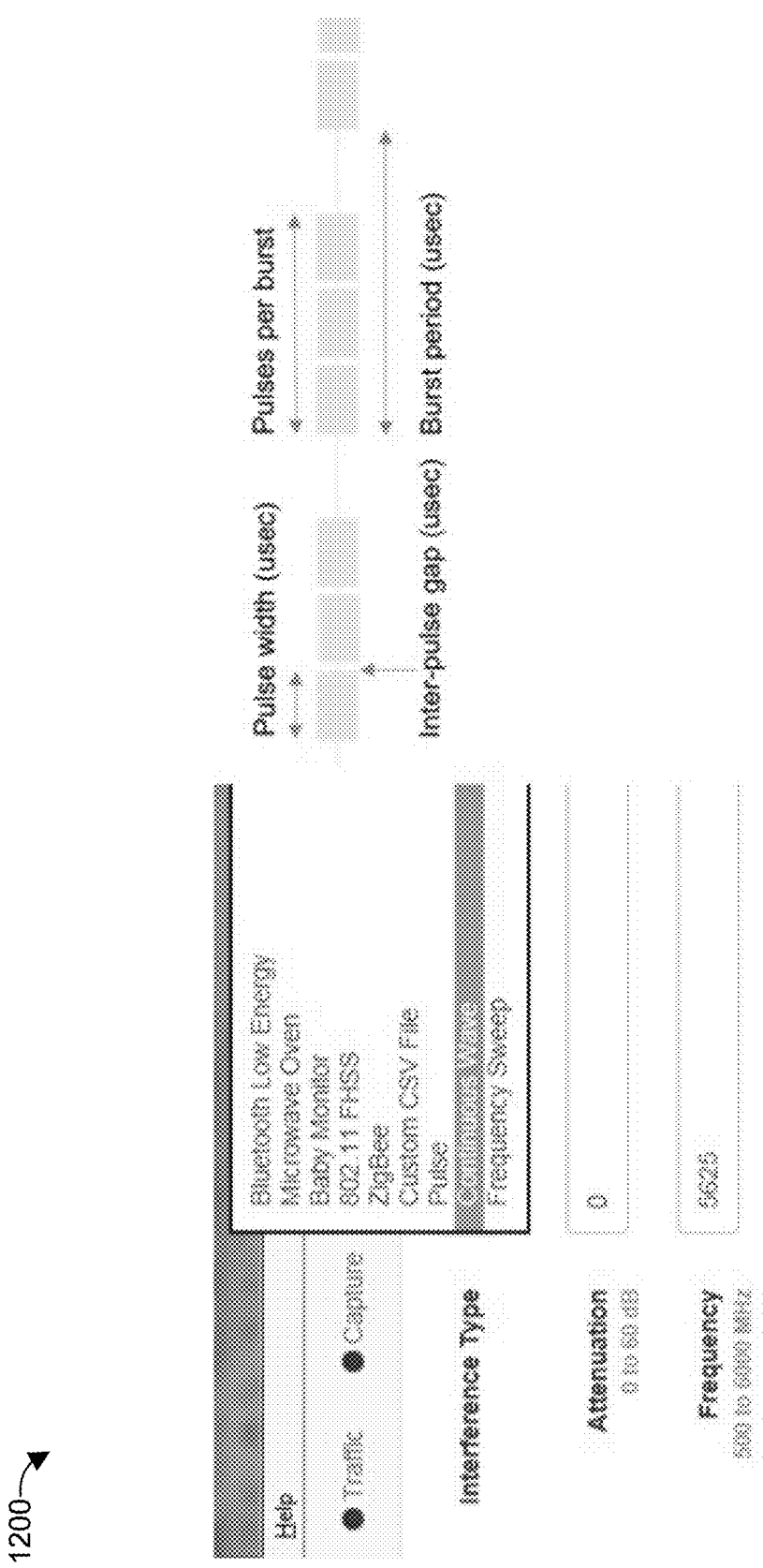
FIG. 12 is an example screenshot of a user interface to configure an interference generator.

The interference generator 1003 can generate interference using a built-in frequency synthesizer including frequency hopping and/or on/off keying (OOK) based waveforms, including radar, BLE, microwave oven, baby monitor, 802.11 FHSS, ZigBee, and custom interference waveforms, as illustrated in screenshot 1200 in FIG. 12. For waveform generation, tone frequency and pulse train parameters can be configured as illustrated in screenshot 1200.

Figure 13:
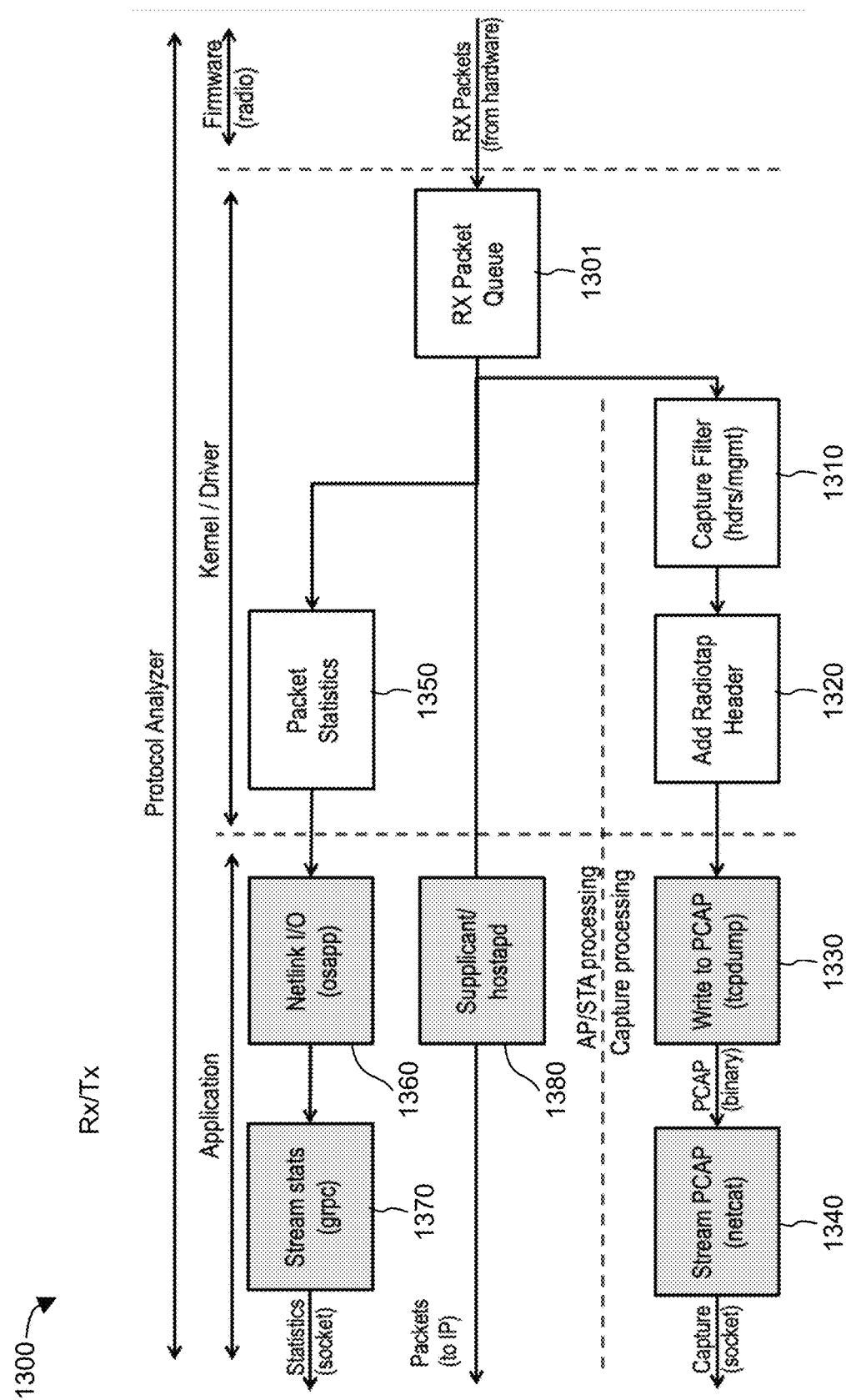
FIG. 13 is a flow chart that illustrates how the software layer stack in the wireless link monitor receives data packets while the wireless link monitor operates simultaneously as an active client and as a testing device according to an embodiment.

FIG. 13 is a flow chart 1300 that illustrates how the software layer stack in the wireless link monitor receives data packets while the wireless link monitor operates simultaneously as an active client and as a testing device according to an embodiment. The software stack includes the firmware layer, the kernel/driver layer, and the application layer. The firmware layer handles receipt/capture of the raw network packets from the wireless device (e.g., the DUT).

The raw packets are sent from the firmware layer to the kernel/driver layer where the raw packets are received at RX Packet Queue 1301. Next, the wireless link monitor simultaneously performs capture processing (e.g., when the wireless link monitor functions as a testing device) and AP/STA processing (e.g., when the wireless link monitors functions as an active client).

In capture processing, the protocol analyzer processes the raw packets through a capture filter 1310 that implements high-level fast filtering to determine which packets to further analyze. Next, the wireless link monitor adds a radiotap header 1320 to the received packets to include the identity of the wireless link monitor that captured the raw packets. Then the wireless link monitor writes 1330 and streams 1340 to PCAP.

In AP/STA processing, the wireless link monitor performs packet statistics 1350 on the raw packets, such as to generate the graphs and plots described herein. Next, the raw packets flow through netlink I/O 1360 and stream statistics 1370. In addition, the raw packets are sent to supplicant/hostapd 1380 as part of the normal receive process.

Thus, it can be seen that the received raw packets (e.g., from a DUT) have two parallel paths in the software layer stack. The first path includes capture processing where the received raw packets are processed by the test device (e.g., inline protocol analyzer). The second path includes AP/STA processing where the received raw packets are processed by the active client for two-way communication with the DUT.

Figure 14:
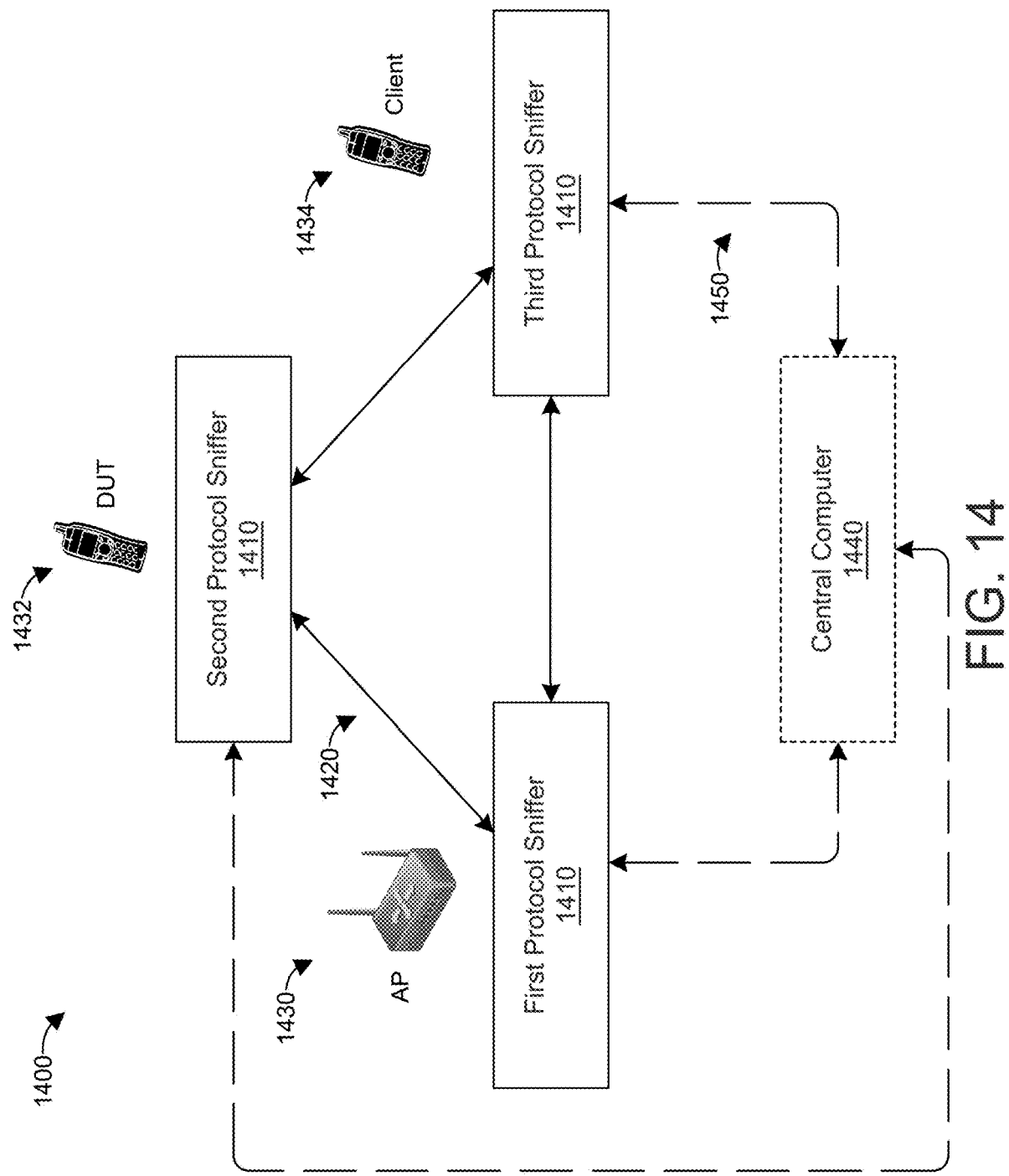
FIG. 14 is block diagram of a system for the simultaneous and synchronized capture of network packets during wireless device testing according to an embodiment.

FIG. 14 is block diagram of a system 1400 for the simultaneous and synchronized capture of network packets during wireless device testing according to an embodiment. The system 1400 includes multiple wireless link monitors 1410 that are each in wireless communication with a respective piece of network equipment (e.g., a wireless DUT). For example, a first wireless link monitor 1410 is in wireless communication with a wireless AP 1430, a second wireless link monitor 1410 is in wireless communication with a wireless DUT 1432, and a third wireless link monitor 1410 is in wireless communication with a wireless client device or station 1434. Each wireless link monitor 1410 operates in monitor or inline mode. Each wireless link monitor 1410 can be the same as wireless link monitor 1000, 900, and/or 100.

The wireless link monitors 1410 are in electrical communication with one another via communication links 1420, which can comprise wired communication links and/or wireless communication links. The communication links 1420 can be used to synchronize the wireless link monitors 1410. For example, the internal clocks of the wireless link monitors 1410 can be synchronized using a clock synchronization protocol and/or a trigger signal. Examples of a clock synchronization protocol include Network Time Protocol and Precision Time Protocol.

The wireless link monitors 1410 can transmit the collected raw test data to a central computer 1440 via communication links 1450. The central computer 1440 can merge the raw test data from each wireless link monitor 1410 for analysis. Additional details of the synchronization of protocol sniffers and data merging is disclosed in U.S. Patent Application Publication No. 2020/0028905, titled "System and Method for Synchronizing Protocol Analyzers During Wireless Testing," published on Jan. 23, 2020, and U.S. Patent Application Publication No. 2020/0029286, titled "System and Method for Synchronizing Protocol and RF Analyzers During Wireless Testing," published on Jan. 23, 2020, which are hereby incorporated by reference.

The computer 1440 can also be used to configure or interface with any of the wireless link monitors 1410. For example, the computer 1440 can be used to configure one or more wireless link monitors 1410 as an active client for inline testing or to test in monitor mode.

Figure 15:
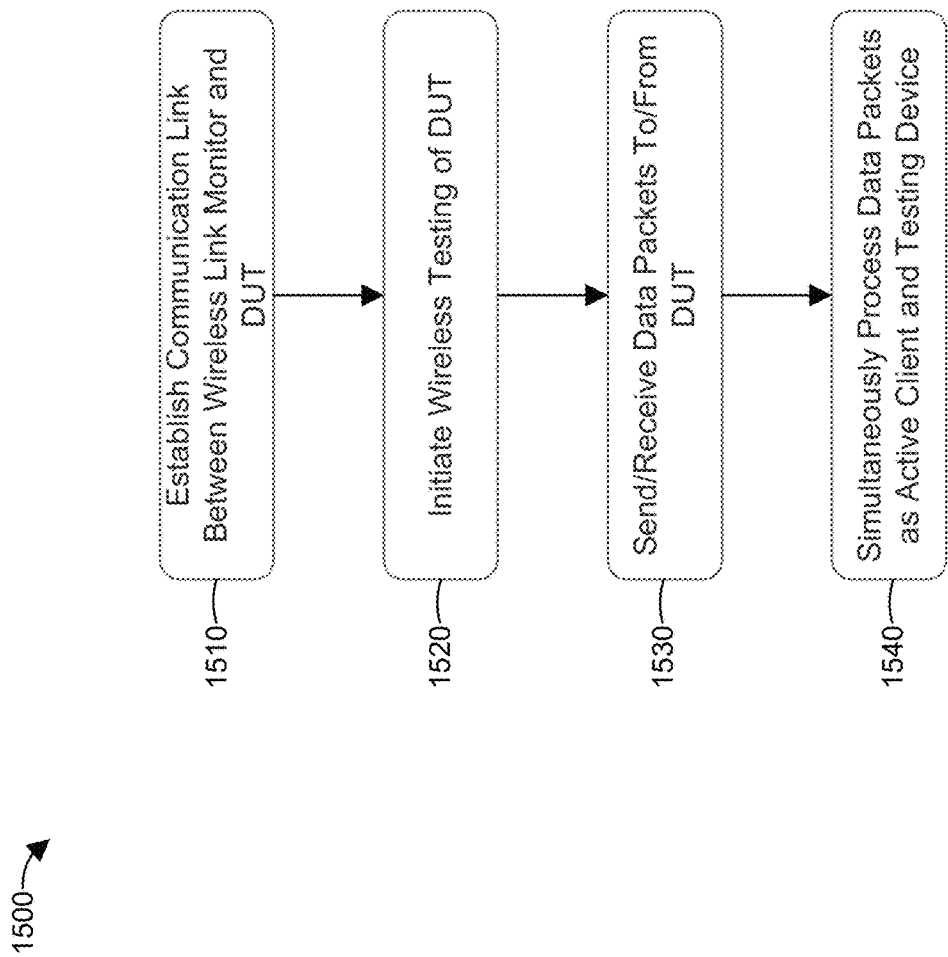
FIG. 15 is a flow chart of a method for wireless device testing according to an embodiment.

FIG. 15 is a flow chart 1500 of a method for wireless device testing according to an embodiment. In step 1510, a communication link is established between a wireless link monitor and a wireless DUT. The wireless link monitor is configured as an active client. The communication link can include wired and wireless connections. In step 1520, inline wireless testing of the DUT is initiated. The inline wireless testing can include any of the wireless tests disclosed herein, such as RvR, RvR with rotation, and/or RvRvO. In step 1530, data packets are sent to the DUT (from the wireless link monitor) and/or received from the DUT (by the wireless link monitor) as part of the wireless test. Since the wireless link monitor is configured as an active client and a communication link is established between the active client and the DUT, the wireless link monitor (e.g., active client) can receive data packets from the DUT even when the DUT is wirelessly communicating using narrow beamforming. In step 1540, the wireless link monitor simultaneously processes the data packets as (a) an active client and (b) as a wireless testing device. For example, the software running on the wireless link monitor can split the data packets into Rx/Tx processing and capture processing, as discussed above.

FIG. 16 is a perspective view of adjustable antenna positioners 1600 in an electromagnetically-isolating test chamber 120 according to an embodiment. Each antenna positioner 1600 is attached to at least one internal wall 1610 of the electromagnetically-isolating test chamber 120. The antenna positioner 1600 has a plurality of degrees of freedom to adjustably position one or more probe antennas 110 in the test chamber 120. The degrees of freedom can be used to adjustably position the probe antenna(s) 110 so that they mirror and/or align with the DUT antennas 1632 of the DUT 130 undergoing testing in the test chamber 120.

For example, the antenna positioner 1600 can be adjustable in a first degree of freedom with respect to a vertical axis 1620 to set a vertical position of the probe antenna(s) 110. In addition, the antenna positioner 1600 can be adjustable in a second degree of freedom with respect to a horizontal axis 1625 to set a horizontal position of the probe antenna(s) 110. In an alternative embodiment, the horizontal axis 1625 extends into and out of the page (i.e., orthogonal to the vertical and horizonal axes 1620, 1625 illustrated in FIG. 16). The antenna positioner 1600 can also be pivotably adjusted in a third degree of freedom to set the angular direction or orientation of the probe antenna(s) 110. The angular direction or orientation of the probe antennas 110 in the antenna positioner 1600 can be measured with respect to the vertical axis 1620 and/or the horizontal axis 1625.

By adjusting the vertical, horizontal, and/or angular direction of the probe antenna(s) 110, the probe antenna(s) 110 can be adjusted to mirror and/or align with the DUT antennas 1632. This allows the probe antennas 110 to receive the same or substantially the same signal (e.g., signal strength as measured by RSSI) as the DUT 130 using the DUT antennas 1632.

FIG. 17 is a detailed view of one of the antenna positioners 1600 illustrated in FIG. 16. The antenna positioner 1600 includes a shaft 1710, a mounting bar 1720, and antenna supports 1730. The shaft 1710 has a height 1712 that extends parallel to the vertical axis 1620. The shaft 1710 is attached (e.g., fixedly attached) to at least one internal wall 1610 of the electromagnetically-isolating test chamber 120. In some embodiments, the shaft 1710 is located in a corner of the electromagnetically-isolating test chamber 120 in which case the shaft 1710 can be attached to the neighboring internal walls 1610 that define the corner.

The mounting bar 1720 is adjustably mounted along the height of the shaft 1710. The shaft 1710 includes a plurality of holes 1715 along the height 1712 of the shaft 1710 where the mounting bar 1720 can releasably engage the shaft 1710. In another embodiment, the mounting bar 1720 can slide up and down the shaft 1710 to set the height of the mounting bar 1720, which can provide the first degree of freedom.

Each antenna support 1730 holds an antenna 110. The antenna supports 1730 can be adjustably positioned along the length 1722 of the mounting bar 1720 (e.g., in the second degree of freedom), where the length 1722 is parallel to the horizontal axis 1625. For example, the antenna supports 1730 can slidably engage the mounting bar 1720. In addition, each antenna support 1730 is pivotably attached to the mounting bar 1720 to set an angular orientation or angular direction of the respective antenna 110 (e.g., in the third degree of freedom).

In summary, the vertical position of an antenna 110 can be set by adjusting the height of the mounting bar 1720 with respect to the shaft 1710. The horizonal position of the antenna 110 can be set by adjusting the position of the antenna support 1730 along the length 1722 of the mounting bar 1720. The angular orientation/direction of the antenna 110 can be set by pivoting the antenna support 1730 with respect to the mounting bar 1720 (e.g., with respect to the vertical and/or horizontal axes 1620, 1625, respectively).

The present invention should not be considered limited to the particular embodiments described above. Various modifications, equivalent processes, as well as numerous structures to which the present invention may be applicable, will be readily apparent to those skilled in the art to which the present invention is directed upon review of the present disclosure. The above-described embodiments may be implemented in numerous ways. One or more aspects and embodiments involving the performance of processes or methods may utilize program instructions executable by a device (e.g., a computer, a processor, or other device) to perform, or control performance of, the processes or methods.

In this respect, various inventive concepts may be embodied as a non-transitory computer readable storage medium (or multiple non-transitory computer readable storage media) (e.g., a computer memory of any suitable type including transitory or non-transitory digital storage units, circuit configurations in Field Programmable Gate Arrays or other semiconductor devices, or other tangible computer storage medium) encoded with one or more programs that, when executed on one or more computers or other processors, perform methods that implement one or more of the various embodiments described above. When implemented in software (e.g., as an app), the software code may be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smartphone or any other suitable portable or fixed electronic device.

Also, a computer may have one or more communication devices, which may be used to interconnect the computer to one or more other devices and/or systems, such as, for example, one or more networks in any suitable form, including a local area network or a wide area network, such as an enterprise network, and intelligent network (IN) or the Internet. Such networks may be based on any suitable technology and may operate according to any suitable protocol and may include wireless networks or wired networks.

Also, a computer may have one or more input devices and/or one or more output devices. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

The non-transitory computer readable medium or media may be transportable, such that the program or programs stored thereon may be loaded onto one or more different computers or other processors to implement various one or more of the aspects described above. In some embodiments, computer readable media may be non-transitory media.

The terms "program," "app," and "software" are used herein in a generic sense to refer to any type of computer code or set of computer-executable instructions that may be employed to program a computer or other processor to implement various aspects as described above. Additionally, it should be appreciated that, according to one aspect, one or more computer programs that when executed perform methods of the present application need not reside on a single computer or processor, but may be distributed in a modular fashion among a number of different computers or processors to implement various aspects of the present application.

Computer-executable instructions may be in many forms, such as program modules, executed by one or more computers or other devices. Generally, program modules include routines, programs, objects, components, data structures, etc. that performs particular tasks or implement particular abstract data types. The functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Thus, the present disclosure and claims include new and novel improvements to existing methods and technologies, which were not previously known nor implemented to achieve the useful results described above. Users of the present method and system will reap tangible benefits from the functions now made possible on account of the specific modifications described herein causing the effects in the system and its outputs to its users. It is expected that significantly improved operations can be achieved upon implementation of the claimed invention, using the technical components recited herein.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

What is claimed is:

1. A test instrument for a wireless device-under-test (DUT), comprising:
    a processor;
    a radio in electrical communication with the processor;
    non-volatile memory in electrical communication with the processor, the non-volatile memory storing computer-readable instructions that, when executed by the processor, cause the processor to:
        configure the test instrument to function simultaneously as an active client that uses the radio to transmit and receive wireless traffic to and from the DUT and as an inline wireless link monitor that monitors wireless traffic by capturing wireless packets sent between the active client and the DUT;
        establish a wireless communication link between the active client and the DUT; and
        wherein the inline wireless link monitor captures and streams the wireless packets in packet capture (PCAP) or other packet format that captures packet headers and payload and applies timestamps, and
        wherein each test instrument has an internal clock, and the internal clocks are time-synchronized according to a time synchronization protocol;
        merge the streams of the wireless packets using the timestamps applied by the synchronized internal clocks;
        generate a plot of a wireless communication link characteristic for the DUT using the synchronized merged streams of wireless packets.

2. The test instrument of claim 1, wherein the active client comprises a wireless access point (AP).

3. The test instrument of claim 1, wherein the active client comprises a wireless station.

4. The test instrument of claim 1, wherein the computer-readable instructions further cause the processor to generate a plot of a wireless communication link characteristic.

5. The test instrument of claim 4, wherein the wireless communication link characteristic includes a received signal strength indicator (RSSI), a data rate, a number of spatial streams, or a channel width.

6. The test instrument of claim 5, wherein the computer-readable instructions further cause the processor to generate a plot of a physical layer characteristic of the wireless packets.

7. The test instrument of claim 1, wherein the wireless communication link comprises a Wi-Fi wireless communication link that is compliant with IEEE 802.11.

8. The test instrument of claim 7, wherein the Wi-Fi wireless communication link is compliant with IEEE 802.11 ax.

9. The test instrument of claim 1, further comprising a common housing, wherein the processor, the radio, and the non-volatile memory are disposed in the common housing.

10. A system for testing wireless devices, comprising:
    a plurality of RF-isolated chambers; and
    a plurality of test instruments, in network communication with each other, each test instrument disposed to monitor a respective RF-isolated chamber and comprising:
    a processor;
    a radio in electrical communication with the processor; and
    non-volatile memory in electrical communication with the processor, the non-volatile memory storing computer-readable instructions that, when executed by the processor, cause the processor to:
        configure the test instrument to function simultaneously as an active client that uses the radio to transmit and receive wireless traffic to and from a device-under-test (DUT) in the respective RF-isolated chamber and as an inline wireless link monitor that monitors wireless traffic by capturing wireless packets sent between the active client and the DUT;
        establish a wireless communication link between the active client and the DUT in the respective RF-isolated chamber; and
        wherein the inline wireless link monitor captures and streams the wireless packets in packet capture (PCAP) or other packet format that captures packet headers and payload and applies time stamps, and
        wherein each test instrument has an internal clock, and the internal clocks are time-synchronized according to a time synchronization protocol;
        merge the streams of the wireless packets using the timestamps applied by the synchronized internal clocks;
        generate a plot of a wireless communication link characteristic for the DUT using the synchronized merged streams of wireless packets.

11. The system of claim 10, wherein the internal clocks of the test instruments are synchronized to an internal clock of the computer.

12. The system of claim 10, wherein the wireless communication link characteristic includes a received signal strength indicator (RSSI), a data rate, a number of spatial streams, a channel width, or a modulation and coding scheme (MCS) index value.

13. The system of claim 12, wherein the plot indicates a resource unit allocated for each DUT.

14. The system of claim 10, wherein each test instrument further comprises a respective common housing and the processor, radio, and non-volatile memory of each test instrument is disposed in the respective common housing.

15. The system of claim 10, wherein the active client of each test instrument comprises a wireless access point (AP) or a wireless station.

16. The system of claim 10, wherein the time synchronization protocol comprises a clock synchronization protocol.

17. The system of claim 16, wherein the clock synchronization protocol comprises a Network Time Protocol or a Precision Time Protocol.

18. A test instrument for a wireless device-under-test (DUT), comprising:
    a processor;
    a radio in electrical communication with the processor; and non-volatile memory in electrical communication with the processor, the non-volatile memory storing computer-readable instructions that, when executed by the processor, cause the processor to:
        configure the test instrument to function simultaneously as an active client that uses the radio to transmit and receive wireless traffic to and from the DUT and as an inline wireless link monitor that monitors wireless traffic by capturing wireless packets sent between the active client and the DUT;
        establish a wireless communication link between the active client and the DUT, wherein the inline wireless link monitor captures and streams the wireless packets in packet capture (PCAP) or other packet format that captures packet headers and payload and applies time stamps,
    wherein each test instrument has an internal clock, and the internal clocks are time-synchronized according to a time synchronization protocol;
    merge the streams of the wireless packets using the timestamps applied by the synchronized internal clocks to provide a synchronized merged stream of wireless packets;
    generate a plot of a wireless communication link characteristic; and
    when a user selects a data point on the plot, automatically display wireless packet data that corresponds to the data point.

19. The test instrument of claim 18, wherein the computer-readable instructions further cause the processor to automatically display the wireless packet data in a new window.

20. The test instrument of claim 18, wherein the active client comprises a wireless access point (AP).

21. The test instrument of claim 18, wherein the active client comprises a wireless station.

22. The test instrument of claim 18, wherein the computer-readable instructions further cause the processor to generate a plot of a wireless communication link characteristic.

23. The test instrument of claim 22, wherein the wireless communication link characteristic includes a received signal strength indicator (RSSI), a data rate, a number of spatial streams, or a channel width.

24. The test instrument of claim 23, wherein the computer-readable instructions further cause the processor to generate a plot of a physical layer characteristic of the wireless packets.

* * * * *